United States Patent Office 3,597,342
Patented Aug. 3, 1971

3,597,342
METHOD FOR THE DRY CHLORINATION OF POLYVINYL CHLORIDE USING A LIQUID SWELLING AGENT
Mario De Vita, Matera, Pietro Pece, Macchia di Ferrandina, and Attilio Palvarini and Pietro Vaccari, Milan, Italy, assignors to Pozzi Ferrandina S.p.A. Ferrandina, Matera, Italy
No Drawing. Filed Mar. 25, 1968, Ser. No. 715,531
Claims priority, application Italy, Apr. 1, 1967, 14,459/67
Int. Cl. C08d *1/00;* C08f *3/22*
U.S. Cl. 204—159.18                                7 Claims

ABSTRACT OF THE DISCLOSURE

A method for preparing superchlorinate polyvinyl chloride is disclosed, in which the chlorination stage is performed by chlorinating a dry admixture of polyvinyl chloride and a fluid chlorination medium. Said fluid chlorination medium is a nonsolvent swelling agent for the starting polymer, and activation energy by UV irradiation is used to promote the chlorination reaction. Typical chlorination media are chlorinated hydrocarbons of the aliphatic series and mixtures thereof.

---

This invention relates to a method for the dry chlorination of polyvinyl chloride (PVC), this method being directed to obtaining a product having improved heat-resistance features.

More particularly, the subject method is directed to obtaining a product characterized by an improved thermal stability, a very satisfactory homogeneousness and a higher softening point.

Said chlorination step is advantageously carried out on account of the fact that, while the conventional commercial PVC's are characterized by softening points (measured according to the Vicat procedure) comprised between 75° C. and 90° C., the chlorinated PVC have a higher softening point, whose trend is increasing as a function of the chlorination rating. The most important products from the point of view of the possible applications have softening points which attain 100° C. or even exceed said temperature.

In addition to the well known chlorination processes for PVC in wet conditions, that is, in suspension or solution in aqueous media and particulate mixtures, dry chlorination methods for PVC have already been devised in the past. Said methods involve the direct chlorination, with gaseous chlorine, of the polymer in the form of a dry powder, with the aid of an activation energy source such as an UV lamp.

These dry methods are doubtless characterized by a greater simplicity and cheapness as compared with the wet methods.

However, the product thus obtained still exhibits the shortcoming of a lower thermal stability, which is probably a result of the difficulty of effecting an appropriate control of the reaction temperature and of obtaining an adequate homogeneousness, as far as the degree of chlorination is involved, in each and every PVC particle.

It has now been ascertained that these shortcomings can be advantageously obviated by employing, in the dry chlorination of PVC, a chlorination medium consisting of an appropriate swelling agent for PVC, which is not, however, a solvent for the polymer.

The method according to this invention comprises the steps of admixing beforehand at room temperature the starting PVC with the chlorination medium, up to a percentage of this latter which does not exceed 60 parts of the medium per 100 parts of PVC, forming a dry mixture, feeding said mixture to a chlorination reactor equipped with appropriate stirring devices, then introducing gaseous chlorine into the chlorination reactor under the concurrent action of an activation source, while keeping the reaction temperature to a value which is in the range of from between 0° C. and 65° C., and finally drawing off the chlorination medium from the end product, said medium being susceptible of being recovered on a quantitative basis.

The chlorination medium, as hereinbefore mentioned, is a compound which exhibits a swelling action on the starting polymer. It is, preferably, a chlorinated hydrocarbonaceous derivative, such as chloroform, carbon tetrachloride, etc. Preferably, said swelling agent must have a poor chemical affinity towards chlorine, to prevent that it, by reacting with chlorine, may give rise to an increased chlorine consumption.

Moreover, in order to encourage the subsequent separation of the end product, the chlorination medium must preferably have a boiling point which is below the degradation temperature, or, the softening point of the end polymer.

It should be understood that it is possible to employ, as the chlorination medium, also appropriate mixtures of swelling agents, preferably consisting of chlorinated hydrocarbons having the desired specifications.

In order to carry the inventive method into constructive practice, any of the systems as commonly used in the technology of powdered or granular product can be adopted.

For example, the chlorination reactor can be a fluid-bed cylindrical reactor, in which the dry reaction mixture is fluidized by the agency of the gaseous chlorine which acts as the reactant, or, as an alternative, by a mixture of gaseous chlorine and recycled gases. Otherwise a reactor can be used, which is equipped with a mechanical stirring device, a thermostat or also a centrifugal mixer.

The activation source consists, as a rule, of an UV lamp, placed within the reactor, and in such a case it is active on the reaction mass directly, or outside the reactor, and in the latter case the gaseous chlorine is irradiated prior to being fed into the reactor.

It should be observed that, in the case in which gaseous chlorine which has been previously irradiated from the outside is fed into the reactor, it is avoided to subject the material to direct irradiation, which is susceptible of giving rise to degradation if precautionary measures are not observed, the advantages of improved thermal stability thus obtained being self-explanatory.

The invention will be better understood with reference to the following examples.

EXAMPLE 1

The dry mixture comprises:

| | Gr. |
|---|---|
| PVC Pozzi S 72 | 400 |
| Chloroform | 200 |

The mixture is prepared at room temperature in a ribbon mixture during 15 minutes approx.

The dry mixture is then charged into a glass cylindrical reactor of the capacity of 3 litres, which is rotated at a rate of 50 r.p.m. and with a temperature of reaction kept constantly at 30° C.

At the outset, the chlorination reactor should be thoroughly scavenged with an inert gas to expel air, then gaseous chlorine is fed in at a rate of flow of 1000 cu. cm. a minute. As the reactor is saturated with chlorine, a fluorescent 20-watt lamp is placed at 1 cm. from the reactor and switched on.

The reactor is driven to rotation during 3 hrs. in total. Every 15 mins. a resin sample is drawn off the reactor and the results thus obtained are tabulated below, wherein the column A refers to chlorinated PVC according to this invention whereas the column B refers to dry-chlorinated PVC made without any chlorination medium.

| Sample No.: | Time, mins. | Chlorine percentage A | Chlorine percentage B |
| --- | --- | --- | --- |
| 1 | 15 | 60.1 | 57.2 |
| 2 | 30 | 61.7 | 57.5 |
| 3 | 45 | 62.2 | 57.7 |
| 4 | 60 | 63.1 | 57.9 |
| 5 | 90 | 64.1 | 58.3 |
| 6 | 120 | 64.5 | 58.6 |
| 7 | 150 | 64.9 | 58.8 |
| 8 | 180 | 65.1 | 59.0 |

After 3 hours the reaction is stopped by discontinuing the chlorine feed and scavening with nitrogen until any chlorine residue has been driven off.

The chlorinated polymer is purified by washing it with alkaline solution and subsequently with distilled water until the chlorine ion has been discharged. To remove the last traces of chloroform, the chlorinated PVC is washed with methanol and then dried in a vacuo at 50 C. As an alternative, the complete removal of chlorine, hydrogen chloride and chloroform from the reactor can be obtained within the reactor itself by the separate or concurrent action of heat and vacuum.

The chlorinated PVC thus obtained contains 65.1% chlorine and its Vicat softening point is 105° C.

The thermal stability, as determined on a mixture comprising:

| | Parts |
| --- | --- |
| Chlorinated PVC | 100 |
| Ba/Cd stabilizer | 3 |
| Epoxide stabilizer | 0.5 | placed in an air circulation oven at 175° C., is 200 mins. whereas the starting PVC, under the same conditions, exhibits a thermal stability of 190 mins.

EXAMPLE 2

The dry mixture comprises:

| | Gr. |
| --- | --- |
| PVC Pozzi S 72 | 400 |
| Chloroform | 150 | and is prepared in a ribbon mixture at room temperature, during a time of 15 mins. approx.

The dry mixture is charged in a 3-liter vertical glass reactor, adapted to fluidize PVC in a chlorine stream.

The reactor is first scavenged with an inert gas to expel air and then wholly saturated with chlorine. The reaction is primed by switching on a 20-watt fluorescent lamp placed at a distance of 1 cm. from the reactor. The unreacted chlorine is recycled by a pump and supplemented by fresh chlorine at an overall feed rate of 500 mls. a minute.

Hydrogen chloride is continuously vented off. The reaction temperature is kept at 20° C.

After two hours the reaction is discontinued, the residual chlorine is driven off with nitrogen and the chlorinated stock is recovered with the operations described in Example 1. The chlorinated PVC thus obtained contains 64% chlorine and the Vicat softening point is 102° C.

Thermal stability, as determined according to Example 1, is 195 mins.

EXAMPLE 3

The dry mixture comprises:

| | Gr. |
| --- | --- |
| PVC Pozzi S 72 | 2,000 |
| Chloroform | 500 | and is prepared in a ribbon mixture at room temperature and during about 15 mins.

The dry mixture is charged in a reactor consisting of a centrifugal mixture having a capacity of 10 liters and vitrified in its interior, the rotational speed being 500 r.p.m.

The reactor is first scavenged with an inert gas to drive off air and then completely saturated with chlorine.

The reaction is started by switching on a 100-watt incandescent lamp placed in the interior of the reactor.

Chlorine is fed at a rate of flow of 3 liters a minute. The reaction temperature is kept at 40° C. and the chloroform which is set free is condensed and supplemented with fresh chloroform.

After one-hour the reaction is discontinued. The residual chlorine is driven off by scavening with nitrogen and the chlorinated stock is drawn as reported in the previous examples.

The chlorinated PVC thus obtained contains 64.1% chlorine and the Vicat softening point is 102° C.

Thermal stability, as determined as set forth in the previous examples, is 195 mins.

EXAMPLE 4

The test of Example 1 is repeated exactly, but the dry mixture comprises:

| | Gr. |
| --- | --- |
| PVC Pozzi S 72 | 400 |
| Carbon tetrachloride | 200 |

Chlorinated PVC obtained after a 3-hour chlorination has the following specifications:

Chlorine percentage—64.5%
Softening point—103° C.
Thermal stability at 175° C.—195 mins.

EXAMPLE 5

The test of Example 1 is exactly repeated, but the mixture employed comprises:

| | Gr. |
| --- | --- |
| PVC Pozzi S 72 | 400 |
| Carbon tetrachloride | 100 |
| Chloroform | 100 |

Chlorinated PVC as obtained after a 3-hour chlorination has the following specifications:

Chlorine percentage—64.8
Softening point—104°
Thermal stability at 175° C.—200 mins.

EXAMPLE 6

The same procedure as in Example 1 is adopted, but with external irradiation by irradiating chlorine with a 100-watt UV lamp placed at the inlet of the reactor.

Chlorinated PVC as obtained after a 3-hour chlorination has the following specifications:

Chlorine percentage—64%
Vicat softening point—102° C.
Thermal stability at 175° C.—200 mins.

What is claimed is:

1. A method of dry chlorination of polyvinyl chloride with gaseous chlorine comprising the steps of admixing powdered polyvinyl chloride and sufficient liquid swelling agent therefor to swell said powdered polyvinyl chloride while still retaining a dry mixture of said polyvinyl chloride and swelling agent, said swelling agent being substantially completely absorbed by said polyvinyl chloride; chlorinating said mixture at a temperature in the range of from about 0° C. and 65° C. in the presence of actinic light energy, and removing said swelling agent from the final chlorinated stock.

2. A method according to claim 1, characterized in that said swelling agent is an aliphatic chlorinated compound having a boiling point below the degradation temperature of the chlorinated product obtained.

3. A method according to claim 2, wherein the boiling point of said swelling agent is below the softening point of the chlorinated product obtained.

4. A method according to claim 2, wherein the swelling agent is chloroform.

5. A method according to claim 2, wherein the swelling agent is carbon tetrachoride.

6. A method according to claim 2, wherein the swelling agent consists of a mixture of chlorinated hydrocarbons.

7. A method according to claim 1, wherein said dry mixture is prepared by mixing, at room temperature, the starting polyvinyl chloride with the swelling agent in a proportion up to 60 parts of swelling agent per 100 parts of polymer.

References Cited

FOREIGN PATENTS

| | | | |
|---|---|---|---|
| 1,325,466 | 6/1962 | France | 260—92.8 |
| 949,895 | 2/1964 | Great Britain | 260—92.8 |
| 6,610,575 | 1/1957 | Netherlands | 260—92.8 |

MURRAY TILLMAN, Primary Examiner

R. B. TURER, Assistant Examiner

U.S. Cl. X.R.

260—92.8AC